UNITED STATES PATENT OFFICE.

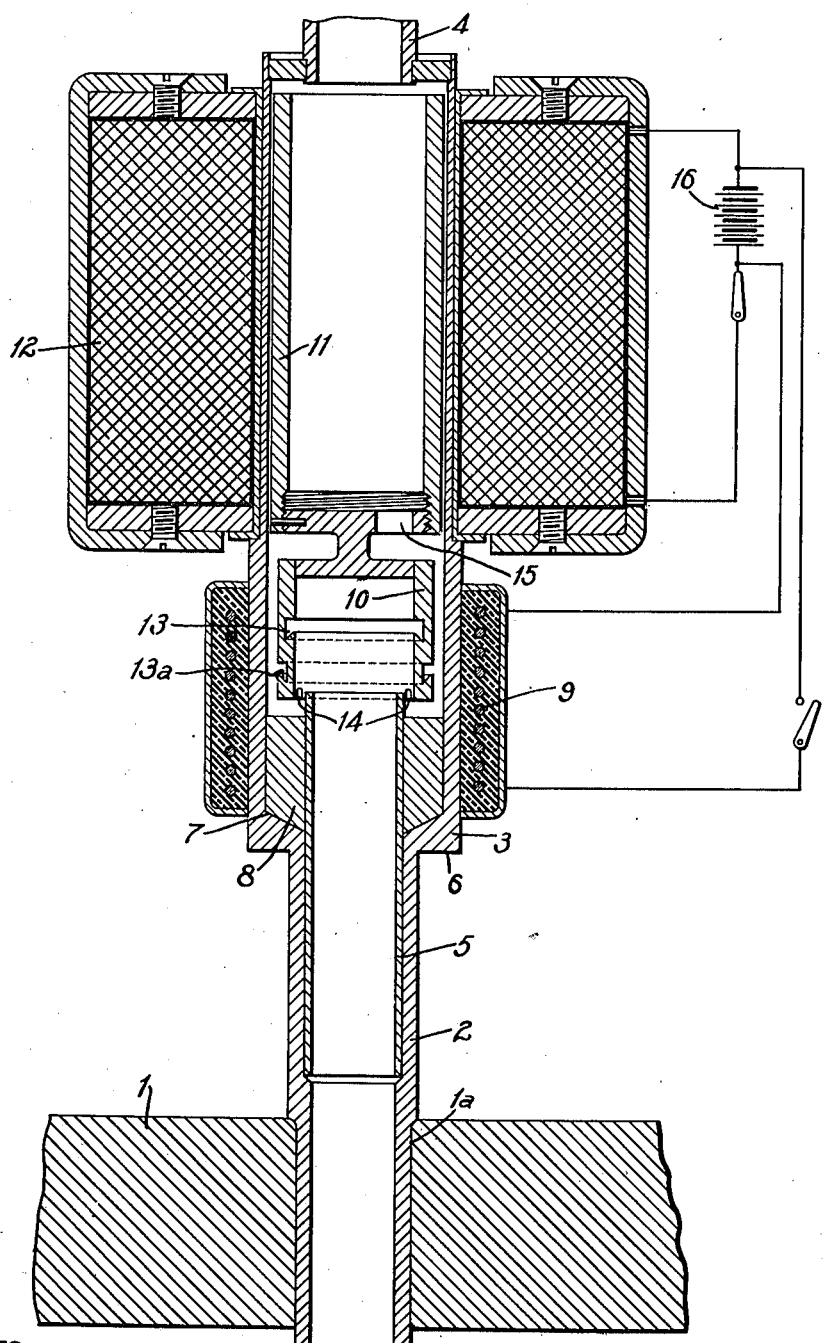

JOSEPH HOHMAN, OF EAST PITTSBURGH, PENNSYLVANIA, ASSIGNOR TO WESTINGHOUSE ELECTRIC AND MANUFACTURING COMPANY, A CORPORATION OF PENNSYLVANIA.

VALVE-SEALING MEANS.

1,292,603.  Specification of Letters Patent.  Patented Jan. 28, 1919.

Application filed June 5, 1916. Serial No. 101,813.

*To all whom it may concern:*

Be it known that I, JOSEPH HOHMAN, a citizen of the United States, and a resident of East Pittsburgh, in the county of Allegheny and State of Pennsylvania, have invented a new and useful Improvement in Valve-Sealing Means, of which the following is a specification.

My invention relates to valves, and it has for its object to provide a device of the character indicated that shall have few and comparatively simple working parts and that shall be adapted to form an extremely tight closure in a fluid passage and to maintain said closure under all conditions of operation.

In the use of large vapor-arc converters, especially of the metal-case type, and of allied forms of apparatus, it is essential that means be provided whereby an evacuating pump may be connected to, and disconnected from, the interior of the container. Ordinary valves are unsuitable for maintaining the extremely high degree of vacuum required in apparatus of the character indicated and, accordingly, valves have been developed wherein a mechanical closure within the exhausting tube may be sealed by mercury or other sealing fluid.

It has been found that, under exceptional circumstances, such, for example, as in railway work, absolute dependence cannot be placed upon a sealing fluid of the character indicated because of the violent agitation to which the apparatus is subjected. In a copending application, Serial No. 61,085, filed Nov. 12, 1915, by E. E. Rose, and assigned to the Westinghouse Electric & Manufacturing Company, is shown and described a valve in which the sealing fluid consists of a mass of solder or other suitable impervious, readily fusible material. There is also shown a heating source whereby the sealing material may be readily fused when it is desired to operate the valve. By this same means, the valve may be sealed when the said material is in a fused condition and the material then may be permitted to solidify, thus forming an extremely tight closure which may be subject to violent agitation without permitting leakage therethrough.

The above-described structure has been found to provide an entirely satisfactory seal for the valve under ordinary working conditions but I have found that, occasionally, there has occurred some slight leakage of the evacuated medium along the surface of the sealing member when the latter was submerged in the sealing material, in spite of the fact that the sealing material appeared to form a tight joint with the sealing member. The probable explanation of this phenomenon is that, when the sealing member is raised out of the sealing pool to permit the container to be evacuated, some peculiar action of the medium being exhausted therefrom causes the formation of an invisible deposit or film upon the surface of the sealing member. This deposit or film, or whatever it may be, prevents the formation of a good joint between the sealing material and the surface of the sealing member when the latter is submerged in the pool, thus giving rise to the apparent "creepage" along the sealing member.

According to the present invention, I provide means whereby portions of the sealing member are coated with portions of the sealing material when the member is not submerged in the pool, thereby preventing access of the evacuated medium to those portions. The portions of sealing material are preferably made continuous around the periphery of the sealing member so that, when the latter is submerged in the pool, barriers will be interposed against the creepage, as described above.

The single figure of the accompanying drawing is a sectional view of a valve embodying a preferred form of my invention, together with associated auxiliary apparatus.

Referring to the drawing for a more detailed understanding of my invention, a portion of the wall 1 of a vapor converter or other closed container is provided with an opening 1ª in which a vertically disposed tube 2 is welded or otherwise tightly sealed. The tube 2 is provided with an enlarged portion 3 communicating with a tube 4 leading to a pump or other evacuating apparatus (not shown). A sleeve 5 is seated within the tube 2 and extends above the shoulder 6 formed by the enlarged portion 3, thus providing an annular trough 7. A mass of readily fusible impervious material 8, such, for example, as solder, is located in the trough 7 and a suitable heating coil 9 is disposed around the enlarged portion 3. It is to be understood that any other suitable means may be provided for melting the material 8, such, for example, as a burner located adjacent to the enlarged portion 3.

A cap 10 is adapted to surround the upper end of the tube 5 and is suspended from a hollow cylindrical member 11 that serves as the armature of a solenoid 12, surrounding the member 3. The cap 10 is provided, on both its inner and outer peripheries, with continuous grooves 13. The grooves 13 are respectively formed with portions inclined to the axis of the member 10, thereby providing seats 13ᵃ below the edges of the grooves. The member 10 is also provided with small notches 14 in the lower edge thereof and the armature 11 is provided with a gas passage 15.

Having described the several parts of the valve, the operation thereof is as follows. Assuming the valve to be closed and the sealing material 8 to be in a solid condition, the heating coil 9 is energized from a suitable source 16 until the sealing material is liquefied. The solenoid 12 is energized from the source 16 and draws up the armature 11, raising the cap 10 and providing a free passage between the container and the tube 4 via the sleeve 5, thence beneath the lower edge of the cap 10 and upwardly through the opening 15. It is apparent that, as the cap 10 is withdrawn from the sealing material 8, portions thereof will fill the seats 13ᵃ, thus forming continuous bands of sealing material on both the inner and outer surfaces of the member 10. Obviously these bands of sealing material will prevent access of the evacuated medium to the surfaces of the seats 13ᵃ. If the free passage of the gas is to be maintained for a long period of time, as for example, during extended pumping, the sealing material 8 may be permitted to solidify and the solenoid 12 be deenergized, thereupon the lower edge of the cap 10 will rest upon the upper surface of the material 8 and gas will flow freely through the notches 14. In order to close the valve, the material 8 is again heated to a fusing point, whereupon the weight of the cap 10 and the armature 11 cause the former to descend into the material 8 to completely submerge the notches 14 and the grooves 13. The heating coil 9 is then deënergized, whereupon the fluid will solidify and a permanently tight and effective seal will be obtained. The bands of sealing material located in the seats 13ᵃ insure that a perfect joint will be obtained at those portions of the cap where the sealing material 8 is always in contact with the surface thereof. In this way, any tendency of the evacuated medium to creep along the surface of the cap in either direction will be effectively prevented.

While there is a wide range of material available for use as a sealing agent, I preferably employ solder or other similar alloy, particularly such as contain small portions of bismuth or other metals which have a tendency to expand slightly when solidifying, thus providing an extremely tight closure.

While I have described my invention in its preferred form, it is obvious that it is susceptible of various minor changes and modifications such as may come within the scope of the appended claims.

I claim as my invention:

1. In a sealing device, the combination with an apertured chamber to be evacuated, a quantity of sealing material carried thereby, and a sealing member adapted to be received in said material to effect a closure of said chamber, of means for protecting portions of the sealing zone of said member from the effects of the evacuated medium.

2. In a valve, the combination with a chamber, to be evacuated, a quantity of sealing material, and a sealing member adapted to be received therein to prevent the passage of a medium through said valve, of means for protecting portions of the sealing zone of said member from the effects of the evacuated medium.

3. In a valve, the combination with a member provided with an aperture and a pool of sealing fluid surrounding said aperture, of a sealing member adapted to surround said aperture, means for causing relative movement of said fluid and said member, whereby said member may be submerged in said fluid, and means for retaining portions of said fluid on said member when the latter is not submerged.

4. In a valve, the combination with a member provided with an aperture and a pool of sealing fluid surrounding said aperture, of a sealing member adapted to surround said aperture, means for causing relative movement of said fluid and said member, whereby said member may be submerged in said fluid, and means embodied in said member for carrying portions of said fluid when the member is not submerged.

5. In a valve, the combination with a member provided with an aperture and a pool of sealing fluid surrounding said aperture, of a sealing member adapted to surround said aperture, means for causing relative movement of said fluid and said member, whereby said member may be submerged in said fluid, and means embodied in said member for maintaining continuous portions of said fluid in contact with the periphery of said member when the latter is not submerged.

6. In a valve, the combination with a member provided with an aperture and a pool of sealing fluid surrounding said aperture, of a sealing member adapted to surround said aperture, means for causing relative movement of said fluid and said member, whereby said member may be submerged in said fluid, the said member being provided with recessed portions to retain portions of said fluid when the member is not submerged.

7. In a valve, the combination with a member provided with an aperture and a pool of sealing fluid surrounding said aperture, of a sealing member adapted to surround said aperture, means for causing relative movement of said fluid and said member, whereby said member may be submerged in said fluid, the said member being provided with pockets adapted to retain portions of said sealing fluid when the member is not submerged.

8. In a valve, the combination with an apertured member, a quantity of sealing material carried by said member, and a sealing member adapted for relative movement with respect to said sealing material, of means for causing portions of said sealing material to be maintained in contact with the surface of said member irrespective of its position with relation to the remainder of said sealing material.

9. In a valve, the combination with an apertured member, a pool of sealing fluid carried by said member and a sealing member adapted to be submerged in said pool, of means for causing portions of said fluid to be maintained in contact with the surface of said member when the latter is not submerged in said pool.

10. In a valve, the combination with an apertured member, a pool of sealing fluid disposed on said member and a sealing member adapted to be submerged in said pool, of means for preventing access of the medium passing through said valve to portions of the sealing zone of said member.

In testimony whereof, I have hereunto subscribed my name this 27th day of May 1916.

JOSEPH HOHMAN.